United States Patent
Okuda (10) Patent No.: US 10,514,667 B2
(45) Date of Patent: Dec. 24, 2019

(54) MACHINE TOOL AND MACHINE LEARNING DEVICE

(71) Applicant: FANUC CORPORATION, Yamanashi (JP)

(72) Inventor: Shinji Okuda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/824,103

(22) Filed: Nov. 28, 2017

(65) Prior Publication Data

US 2018/0157226 A1    Jun. 7, 2018

(30) Foreign Application Priority Data

Dec. 5, 2016 (JP) .................................. 2016-235976

(51) Int. Cl.
  *G06F 19/00* (2018.01)
  *G05B 13/04* (2006.01)
  *G05B 19/4061* (2006.01)
  *G06N 3/08* (2006.01)

(52) U.S. Cl.
  CPC ....... *G05B 13/048* (2013.01); *G05B 19/4061* (2013.01); *G06N 3/08* (2013.01)

(58) Field of Classification Search
  CPC .......................... G05B 13/048; G05B 13/0265
  See application file for complete search history.

(56) References Cited

U.S. PATENT DOCUMENTS

| | | | |
|---|---|---|---|
| 2001/0051841 A1 | 12/2001 | Kawai | |
| 2006/0173573 A1 | 8/2006 | Hosokawa et al. | |
| 2008/0091394 A1 | 4/2008 | Hahn et al. | |
| 2012/0221137 A1* | 8/2012 | Kettemer | G05B 19/4061 700/108 |
| 2012/0290122 A1 | 11/2012 | Morfino et al. | |
| 2015/0352679 A1* | 12/2015 | Yamamoto | G05B 19/4061 73/865.8 |
| 2016/0217388 A1* | 7/2016 | Okanohara | G06N 20/00 |

(Continued)

FOREIGN PATENT DOCUMENTS

| | | |
|---|---|---|
| CN | 101893873 A | 11/2010 |
| CN | 102754039 A | 10/2012 |

(Continued)

OTHER PUBLICATIONS

Notice of Allowance in JP Application No. 2016-235976, dated May 1, 2018, 6pp.

(Continued)

*Primary Examiner* — Mohammad Ali
*Assistant Examiner* — Sheela Rao
(74) *Attorney, Agent, or Firm* — Hauptman Ham, LLP (57) ABSTRACT

A machine tool acquires information related to manual operation from log data recorded when machining and the manual operation are performed in the machine tool, creates input data on the basis of the acquired information, acquires information related to occurrence or non-occurrence of a collision of a spindle or a tool at the time of the manual operation from the log data, and creates teacher data on the basis of the acquired information. Supervised learning is performed using the created input data and the created teacher data, and a learning model is constructed.

6 Claims, 7 Drawing Sheets

(56) References Cited

U.S. PATENT DOCUMENTS

2017/0032283 A1    2/2017   Kamiya
2017/0091667 A1    3/2017   Yukawa

FOREIGN PATENT DOCUMENTS

| | | | |
|---|---|---|---|
| CN | 106202767 | A | 12/2016 |
| DE | 102006043390 | A1 | 3/2008 |
| DE | 102011003374 | A1 | 8/2012 |
| EP | 1166960 | A2 | 1/2002 |
| JP | 11-170142 | A | 6/1999 |
| JP | 2006-215732 | A | 8/2006 |
| JP | 2007-272545 | A | 10/2007 |
| JP | 2007-286688 | A | 11/2007 |
| JP | 2014-164542 | A | 9/2014 |
| JP | 5969676 | B1 | 8/2016 |
| JP | 5997330 | B1 | 9/2016 |
| WO | 2016/069357 | A1 | 5/2016 |

OTHER PUBLICATIONS

Office Action in CN Application No. 201711262786.4, dated Jan. 25, 2019, 19pp.
Office Action in DE Application No. 102017128053.7, dated Jul. 16, 2019, 17 pp.

* cited by examiner

| MACHINING TYPE | NUMERICAL VALUE |
|---|---|
| TURNING | 1 |
| DRILLING | 2 |
| ⋮ | ⋮ |

| TOOL | NUMERICAL VALUE |
|---|---|
| CUTTING TOOL 1 | 1 |
| CUTTING TOOL 2 | 2 |
| ⋮ | ⋮ |
| DRILL 1 | 101 |
| DRILL 1 | 102 |
| ⋮ | ⋮ |

FIG.7

MACHINE TOOL AND MACHINE LEARNING DEVICE

RELATED APPLICATIONS

The present application claims priority to Japanese Application Number 2016-235976 filed Dec. 5, 2016, the disclosure of which is hereby incorporated by reference herein in its entirety.

BACKGROUND OF THE INVENTION

1. Field of the Invention

The present invention relates to a machine tool and a machine learning device for predicting a spindle collision.

2. Description of the Related Art

In a machine tool, a spindle may collide with, for example, a workpiece or a jig due to an improper operation by an operator. Depending on the degree of the collision, the spindle may be damaged to need component replacement. Conceivable examples of the operator's improper operation include an improper machine operation at the time of arrangements, a mistake in tool information setting or workpiece coordinate position setting, interference with the jig, and a mistake in program resumption work after manual intervention operation during unattended running.

As a prior art technique for detecting an abnormality in a machine tool, for example, Japanese Patent Application Laid-Open No. 2007-272545 discloses a technique for storing a stop point for each block of a program, and determining that there is some abnormality and informing a user of the abnormality if the positions of stop points in preceding machining are different from those of stop points in current machining. The technique disclosed in Japanese Patent Application Laid-Open No. 2007-272545 is capable of promptly sensing a failure which cannot be identified from the action of a machine tool, and faulty component machining that is machining under abnormal conditions can be prevented. Additionally, storage of a history of operations allows display of an abnormal operation in case of a failure and analysis of the cause of the abnormality.

Japanese Patent Application Laid-Open No. 11-170142 discloses a technique for detecting occurrence of an abnormality in a spindle, such as an excessive imbalance in a tool, by attaching an acceleration sensor to a spindle head and comparing a detection value from the acceleration sensor with a threshold set in advance and informing an operator of the abnormality. Japanese Patent Application Laid-Open No. 2014-164542 discloses a technique for attaching a non-contact distance sensor to a mobile body, such as a spindle head, a ram, or a saddle, issuing a warning if a detection value of the distance sensor is determined to be smaller than a value set in advance, and reducing the movement speed of the mobile body and stopping movement.

In general, it is difficult to directly sense a collision of a spindle distinctively from any other abnormality during operation of a machine tool by an operator, and the occurrence or non-occurrence of a spindle collision is indirectly estimated from a history of servo-axis abnormal load detection alarms which are sensed from current, torque, and the like of servo motors. However, a collision of the spindle produces maintenance cost, such as the above-described need for component replacement and unavailability of the machine tool until completion of the replacement. There is thus a need for a mechanism capable of preventing a spindle collision or the like due to an improper operation by an operator.

To cope with the above-described problem, the techniques disclosed in Japanese Patent Application Laid-Open No. 2007-272545 and Japanese Patent Application Laid-Open No. 11-170142 are intended to early detect an abnormality at the time of actual occurrence of the abnormality or analyze an abnormal operation later. The techniques, however, are not capable of predicting an abnormality-inducing situation on the basis of operations performed by an operator. Additionally, use of the technique disclosed in Japanese Patent Application Laid-Open No. 2014-164542 allows sensing of a collision of a mobile body, such as a spindle head, but does not allow sensing of a collision of a tool held at a distal end of a spindle with a workpiece in a machining region.

SUMMARY OF THE INVENTION

Under the circumstances, an object of the present invention is to provide a machine tool and a machine learning device capable of, in the machine tool, predicting, from a history of operations by an operator, a situation where a servo-axis abnormal load detection alarm is likely to be generated and giving a warning of a spindle collision.

In the present invention, the above-described problem is solved by performing machine learning on a user-specific operation in a state at the start of manual operation from a history of operations when a servo-axis abnormal load detection alarm is not generated and a history of operations immediately before generation of a servo-axis abnormal load detection alarm, predicting an operation which causes the servo-axis abnormal load detection alarm using a learning model obtained as a result of the machine learning, determining whether a servo-axis abnormal load detection alarm is likely to be generated, and giving notification of a warning.

A machine tool according to the present invention moves a spindle including a tool relative to a workpiece by controlling at least one axis on the basis of a machining program and machines the workpiece. The machine tool includes a machine learning device which predicts occurrence or non-occurrence of a collision between the spindle or the tool and the workpiece, a jig holding the workpiece, or a constituent element of the machine tool, caused by an operation for the axis through manual operation after interruption of the machining. The machine learning device includes a learning model storage unit which stores a learning model constructed by supervised learning using input data based on information related to the manual operation and teacher data based on information related to the occurrence or non-occurrence of the collision of the spindle or the tool at the time of the manual operation, a state observation unit which acquires the information related to the manual operation at the time of the manual operation in the machine tool and creates the input data on the basis of the acquired information related to the manual operation, and a prediction unit which predicts the occurrence or non-occurrence of the collision of the spindle or the tool from the input data created by the state observation unit, using the learning model.

The machine tool can further include an alarm unit which outputs an alarm on the basis of a result of the prediction of the occurrence or non-occurrence of the collision of the spindle or the tool from the machine learning device.

The machine tool can share the learning model stored in the learning model storage unit with at least one different machine tool.

A machine learning device according to the present invention learns, in a machine tool which moves a spindle including a tool relative to a workpiece by controlling at least one axis on the basis of a machining program and machines the workpiece, occurrence or non-occurrence of a collision between the spindle or the tool and the workpiece, a jig holding the workpiece, or a constituent element of the machine tool, caused by an operation for the axis through manual operation after interruption of the machining.

A first aspect of the machine learning device includes a state observation unit which acquires information related to the manual operation from log data recorded when the machining and the manual operation are performed in the machine tool and creates input data on the basis of the acquired information related to the manual operation, a label acquisition unit which acquires information related to the occurrence or non-occurrence of the collision of the spindle or the tool at the time of the manual operation from the log data recorded when the machining and the manual operation are performed in the machine tool and creates teacher data on the basis of the acquired information related to the occurrence or non-occurrence of the collision of the spindle or the tool, a learning unit which performs supervised learning using the input data created by the state observation unit and the teacher data created by the label acquisition unit and constructs a learning model, and a learning model storage unit which stores the learning model.

The machine learning device can share the learning model stored in the learning model storage unit with at least one different machine learning device.

A second aspect of the machine learning device includes a learning model storage unit which stores a learning model constructed by supervised learning using input data based on information related to the manual operation and teacher data based on information related to the occurrence or non-occurrence of the collision of the spindle or the tool at the time of the manual operation, a state observation unit which acquires the information related to the manual operation at the time of the manual operation in the machine tool and creates the input data on the basis of the acquired information related to the manual operation, and a prediction unit which predicts the occurrence or non-occurrence of the collision of the spindle or the tool from the input data created by the state observation unit, using the learning model.

The machine learning device can share the learning model stored in the learning model storage unit with at least one different machine learning device.

According to the present invention, it is possible to predict occurrence of a spindle collision due to manual operation of a machine tool by an operator at the time of the operation and give notification of a warning. This allows prevention of production of maintenance cost due to a spindle collision.

DETAILED DESCRIPTION OF THE PREFERRED EMBODIMENTS

Figure 1:
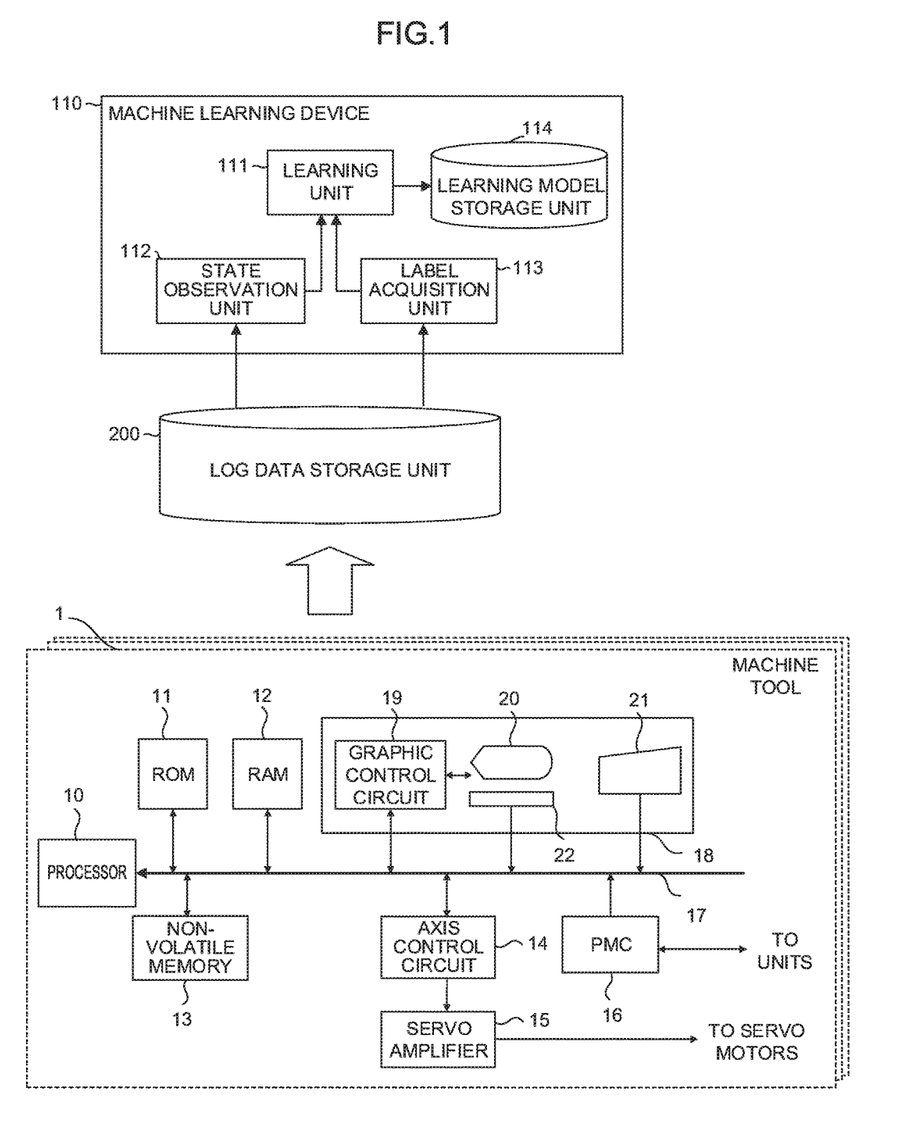
FIG. 1 is a schematic functional block diagram of a machine learning device according to an embodiment of the present invention at the time of learning.

FIG. 1 is a schematic functional block diagram of a machine learning device according to an embodiment of the present invention at the time of learning and a machine tool used for learning by the machine learning device.

A machine learning device 110 according to the present embodiment performs machine learning on the basis of log data collected from one or more machine tools 1 and stored in a log data storage unit 200.

The machine tool 1 having a numeral control function is centered around a processor 10. The processor 10 controls the whole machine tool 1 in accordance with a system program stored in a ROM 11. An EPROM or an EEPROM is used as the ROM 11.

A DRAM or the like is used as a RAM 12, which stores temporary computational data, display data, input and output signals, and the like. A CMOS or an SRAM which is backed up by a battery (not shown) is used as a nonvolatile memory 13, which stores a parameter, a machining program, tool offset data, and the like to be held even after power-down. A piece of log data related to the action of the machine tool 1 (to be described later) is also stored in the nonvolatile memory 13.

A machine operation panel 18 is arranged, for example, at a front surface of the machine tool 1 and is used to display data and graphics related to running of the machine tool 1, accept manual operation input, data input, and the like from an operator, and run the machine tool 1. A graphic control circuit 19 converts digital signals, such as numerical data and graphic data, into raster signals for display and sends the signals to a display device 20. The display device 20 displays numerical values and graphics. A liquid crystal display device is mainly employed as the display device 20.

An input device 21 is composed of a keyboard including a key switch, a rotary switch, a numerical key, a symbolic key, a character key, and a function key and a pointing device, such as a mouse. Key switches of the input device 21 include a switch for designating an axis as a manual control target, and a switch for designating a movement speed for the axis as the manual control target. An operator can perform manual movement along axes of the machine tool 1 by using, in combination, the key switches and the rotary switch for giving an instruction as to an axial movement amount.

A touch panel 22 has a function of sensing an operator's operation, such as a touch or a drag. The touch panel 22 is disposed overlaid on a screen of the display device 20. An operation performed by the operator on a software key, a software button, or a software switch displayed on the screen of the display device 20 can be sensed by the touch panel 22. Note that the touch panel 22 and the display device 20 may be combined into one device.

An axis control circuit 14 outputs an axial movement command to a servo amplifier 15 in response to the axial movement command from the processor 10. The servo amplifier 15 amplifies the movement command, drives a corresponding one of servo motors coupled for the respective axes of the machine tool 1, and controls relative motion between a tool of the machine tool 1 and a workpiece. Although not shown in FIG. 1, each servo motor incorporates a position and speed detector, and a position and speed feedback signal from the position and speed detector is fed back to the axis control circuit 14. Note that although the axis control circuit 14 and the servo amplifier 15 for only one axis are shown in FIG. 1, the axis control circuits 14 and the number of servo amplifiers 15 are provided corresponding to the number of axes of the servo motors.

A programmable machine controller (PMC) 16 receives miscellaneous (M) function signals, spindle speed control (S) function signals, tool selection (T) function signals, and the like from the processor 10 via a bus 17. The PMC 16 processes the signals using a sequence program, outputs output signals, and controls the action and the like of pneumatic equipment, hydraulic equipment, an electromagnetic actuator, and the like inside and outside the machine tool 1. The PMC 16 also performs sequence processing in response to various signals from switches, sensors, and the like installed at units inside the machine tool 1 and transfers necessary input signals to the processor 10 via the bus 17.

Note that a spindle motor control circuit, a spindle motor amplifier, and the like are not shown in FIG. 1.

The machine tool 1 machines a workpiece by controlling the axes of the machine tool 1 with the above-described configuration, and creates a piece of log data related to the action of the machine tool 1 on the basis of signals acquired from the units of the machine tool 1 (for example, inputs from sensors), feedback, such as currents, voltages, positions, and speeds, from the servo motors and a spindle motor, a machining program and design data used for the machining currently performed, setup values, a history of operations on the machine operation panel 18, and the like and stores the piece of log data in the nonvolatile memory 13.

The piece of log data is created so as to allow understanding of the chronological order of signal values, feedback values, the machining program being executed and the design data, the setup values, the history of operations on the machine operation panel 18, and the like. The piece of log data also includes various types of information (for example, an ID of a worker, work stages, and information related to the cause of an abnormality, if any) entered by an operator which operates the machine tool 1 or a maintenance staff member which copes with an abnormality in the machine tool 1, if any, through the machine operation panel 18.

The piece of log data stored in the nonvolatile memory 13 in the above-described manner is collected into the log data storage unit 200 over a network or the like or via an external storage device carried by a worker, such as a machine tool maintenance staff member. The collection may be performed each time a piece of log data is created or may be periodically performed at appropriate intervals.

The log data storage unit 200 may be constructed as a common database. The log data storage unit 200 may be connected to a wired/wireless network. In this case, a piece of log data may be acquired from the machine tool 1 over the network.

The machine learning device 110 performs machine learning on the basis of pieces of log data collected from one or more machine tools 1 and stored in the log data storage unit 200 as described above. An overview of the learning performed by the machine learning device 110 will be described below before describing constituent elements of the machine learning device 110.

Figure 2:
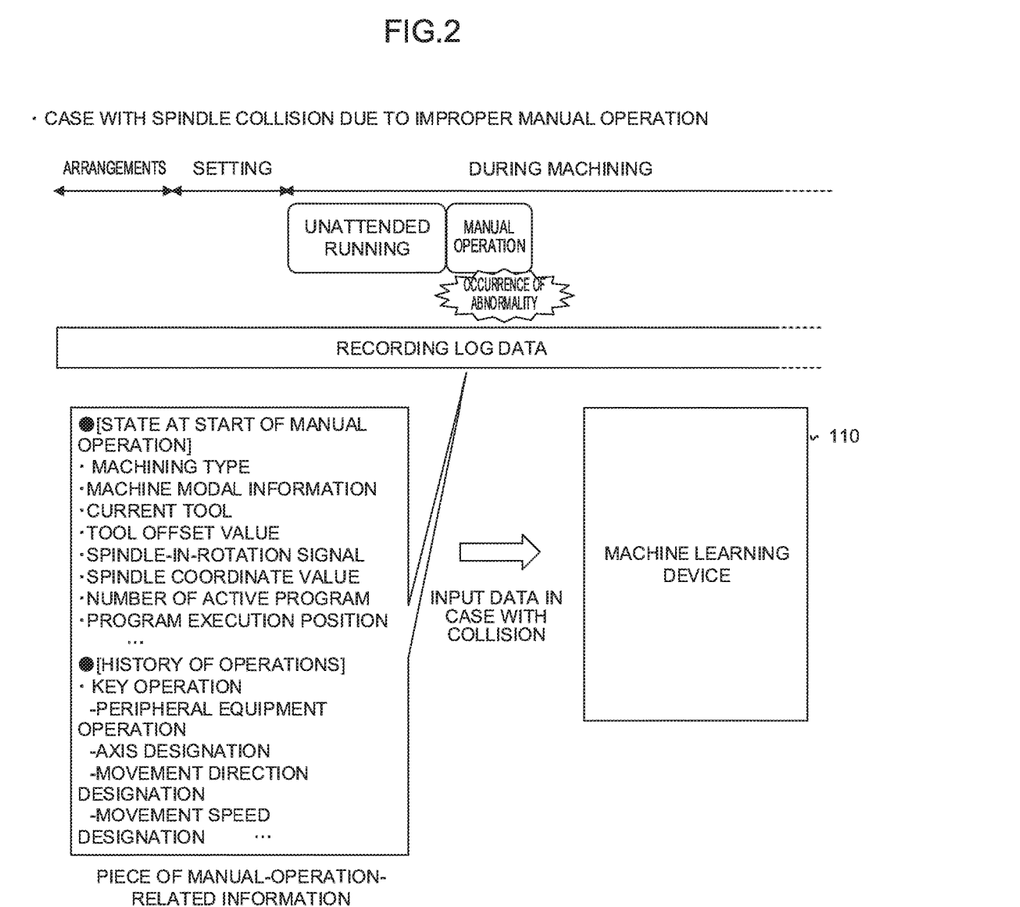
FIG. 2 is a diagram (Part I) for explaining a method for acquiring input data used for learning by the machine learning device in FIG. 1.
Figure 3:
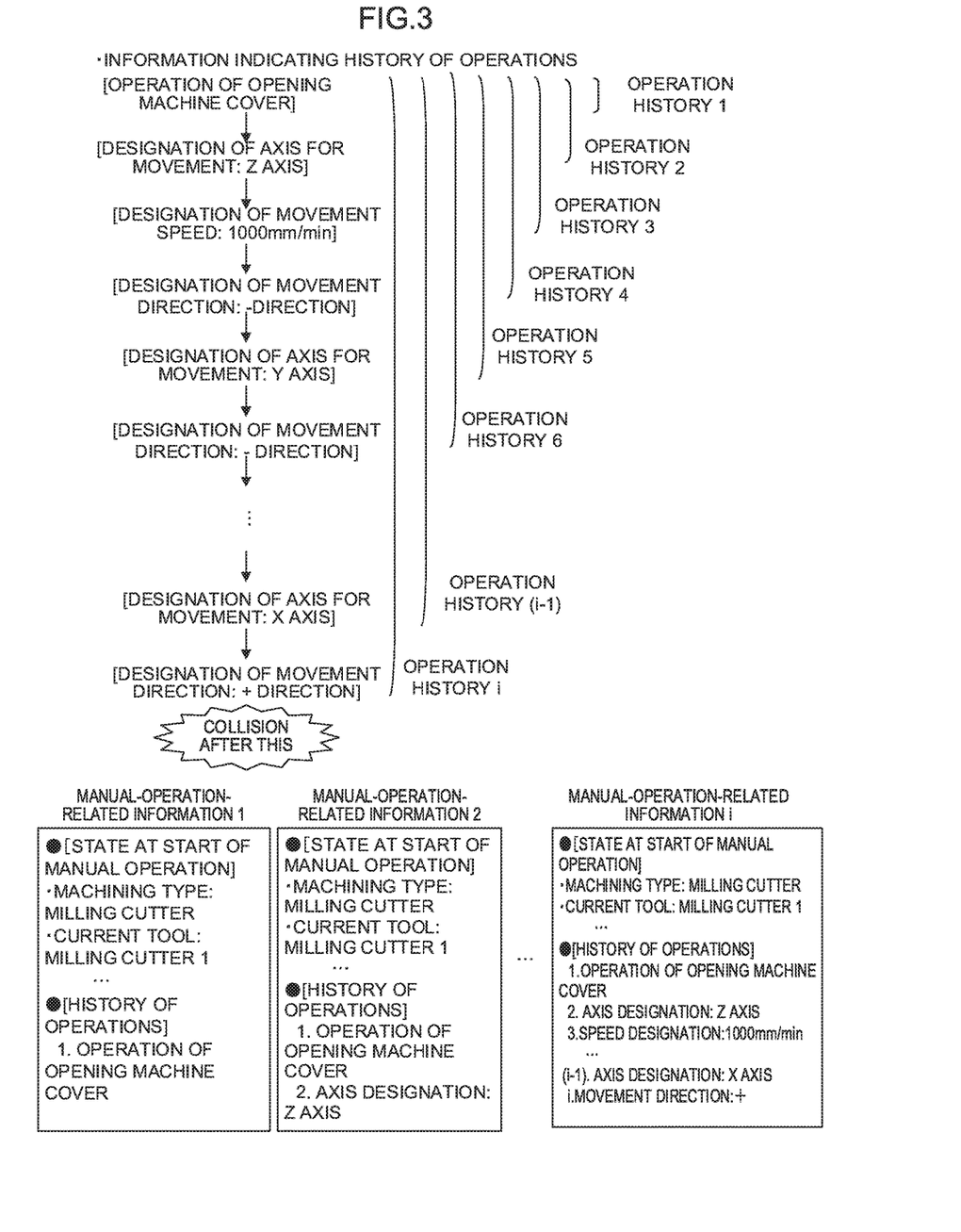
FIG. 3 is a diagram (Part II) for explaining the method for acquiring input data used for learning by the machine learning device in FIG. 1.

FIGS. 2 and 3 are diagrams for explaining the overview of the learning performed by the machine learning device 110 in FIG. 1.

The machine learning device 110 according to the present embodiment creates, from the log data stored in the log data storage unit 200, (i) "input data in a case where a spindle collides due to an improper manual operation by an operator", and (ii) "input data in a case where a spindle collision due to an improper manual operation by an operator is not occurred", as pieces of manual-operation-related information and performs machine learning using the created pieces of manual-operation-related information. The learning by the machine learning device 110 is desirably performed using a large number of pieces of manual-operation-related information created on the basis of a large amount of log data. The learning by the machine learning device 110 need not be performed at one time and may be performed in a plurality of batches, or each time log data collection is performed.

A piece of manual-operation-related information may be created on the basis of pieces of log data before or after the point of occurrence of an abnormality during running by an operator's manual operation in the log data stored in the log data storage unit 200. For example, if a spindle collides due to an improper operation during manual running, occurrence of abnormality in log data is recorded, and the piece of information "Cause of abnormality: spindle collision" is then entered by an operator or a maintenance staff member who repairs the machine tool 1, through the machine operation panel 18, and recorded as a piece of log data. In this case, "input data in a case with a spindle collides due to an improper manual operation by an operator" is created on the basis of a piece of log data before the entry of "Cause of abnormality: spindle collision".

A piece of manual-operation-related information includes information indicating a state at the start of manual operation and information indicating a history of operations by an operator, as shown in FIG. 2.

The information indicating the state at the start of the manual operation may include pieces of information, such as the "machining type" of machining currently performed, "machine modal information" set at the start of the manual operation, a "current tool" attached to a spindle at the start of the manual operation, "tool offset values" set at the start of the manual operation, a "spindle-in-rotation signal" at the start of the manual operation, "spindle coordinate values" at the start of the manual operation, the "number of an active program" interrupted immediately before the start of the manual operation, and a "program execution position".

The information indicating the history of operations by the operator includes information on an operation of a key switch or the like by the operator and a manual setting action on a machine. Examples of the operation of the key switch by the operator may include an "operation of peripheral equipment", such as opening or closing of a machine cover, "designation of an axis to be moved", and "designation of an axial movement direction". Examples of the manual setting action on the machine may include "designation of an axial movement speed" and "tool length setting".

A plurality of pieces of manual-operation-related information can be acquired from one set of pieces of log data.

FIG. 3 is a diagram showing an example of pieces of manual-operation-related information created on the basis of log data.

FIG. 3 shows an example where unattended running of a machine is interrupted during milling using a tool called milling cutter 1, manual operation is started, and a spindle collides after an i-th operation.

In the present embodiment, if performance of i operations is recorded in the log data, as shown in FIG. 3, a piece of manual-operation-related information including a first history of operations (manual-operation-related information 1), a piece of manual-operation-related information including first and second histories of operations (manual-operation-related information 2), . . . , a piece of manual-operation-related information including first to (i−1)-th histories of operations (manual-operation-related information (i−1)), and a piece of manual-operation-related information including first to i-th histories of operations (manual-operation-related information i) are created from the log data.

Manual-operation-related information 1 to manual-operation-related information (i−1) are each handled as "input data in a case where a spindle collision due to an improper manual operation by an operator is not occurred" and is input to the machine learning device 110 together with information related to "Occurrence or non-occurrence of spindle collision: not occurred" as teacher data (label data). Manual-operation-related information i is handled as "input data in a case where a spindle collides due to an improper manual operation by an operator" and is input to the machine learning device 110 together with information related to "Occurrence or non-occurrence of spindle collision: occurred" as teacher data (label data).

Figure 4:
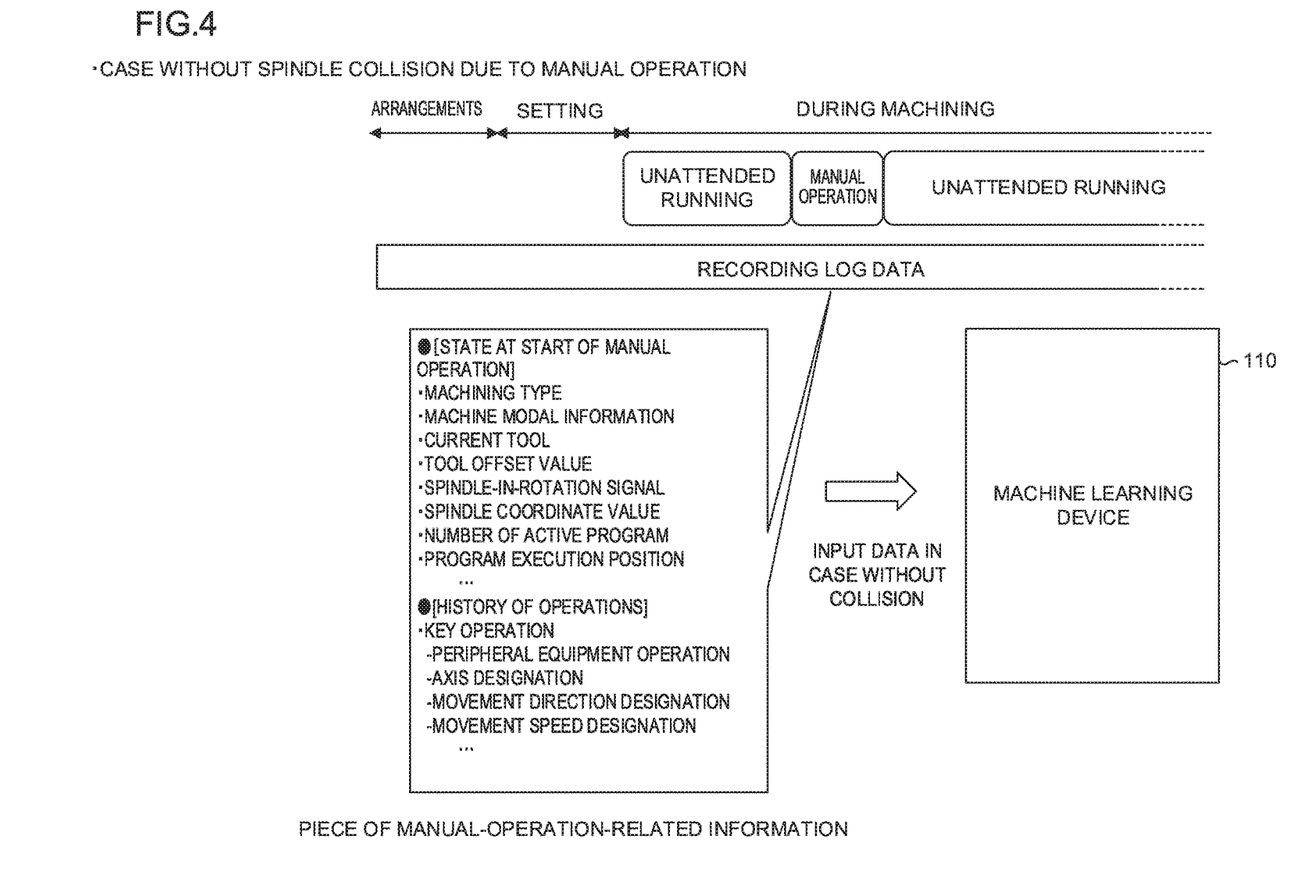
FIG. 4 is a diagram (Part III) for explaining the method for acquiring input data used for learning by the machine learning device in FIG. 1.

A piece of manual-operation-related information may also be created, among the log data stored in the log data storage unit 200, from consecutive pieces of log data in a case where an abnormality during running by an operator's manual operation is not occurred. For example, the piece of manual-operation-related information may be created from pieces of log data in a case where unattended running is interrupted, manual operation by an operator is performed without occurrence of an abnormality, and the unattended running is resumed without trouble. Even in this case, the piece of manual-operation-related information includes information indicating a state at the start of the manual operation and information indicating a history of operations by the operator, as shown in FIG. 4. Pieces of information included in each of the pieces of information are the same as those described with reference to FIGS. 2 and 3. The pieces of manual-operation-related information are each handled as "input data in a case where a spindle collision due to an improper manual operation by an operator is not occurred" and is input to the machine learning device 110 together with information related to "Occurrence or non-occurrence of spindle collision: not occurred" as teacher data (label data).

Constituent elements of the machine learning device 110 will next be described. The machine learning device 110 includes a learning unit 111, a state observation unit 112, a label acquisition unit 113, and a learning model storage unit 114, as shown in FIG. 1.

The learning unit 111 performs supervised learning on the basis of a piece of manual-operation-related information (input data) acquired by the state observation unit 112 and information related to the occurrence or non-occurrence of a spindle collision (also referred to as teacher data or a label) acquired by the label acquisition unit 113, constructs a learning model, and stores the learning model in the learning model storage unit 114. The learning model constructed by the learning unit 111 is used for spindle collision prediction, as will be described later. Any learning model may be used as a learning model to be constructed by the learning unit 111 as long as the learning model allows spindle collision prediction from input data and teacher data as shown in FIGS. 2 to 4 and the like. For example, a multi-layer neural network (to be described later), a Bayesian network, or the like can be used.

Figure 5:
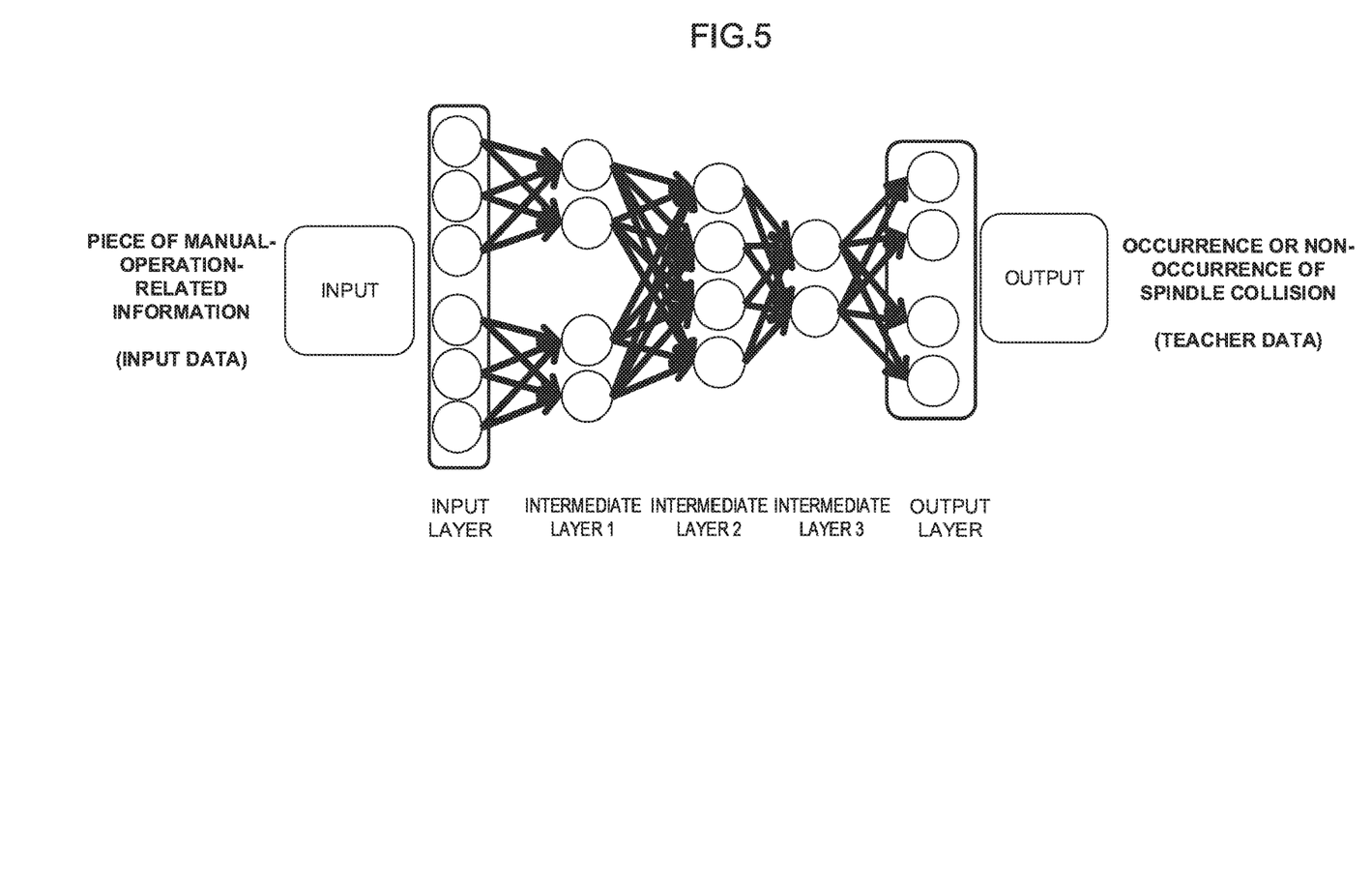
FIG. 5 is a diagram showing an example of a case using a multi-layer neural network as a learning model.

If a multi-layer neural network as shown in, for example, FIG. 5 is used as a learning model, a piece of information related to manual operation performed by the machine tool 1 is given as input data, information indicating the occurrence or non-occurrence of a spindle collision at the time of the manual operation is given as teacher data, and learning is advanced by a method, such as deep learning. Note that a description of the details of a known neural network, deep learning, and the like will be omitted in the present specification.

Figure 6:
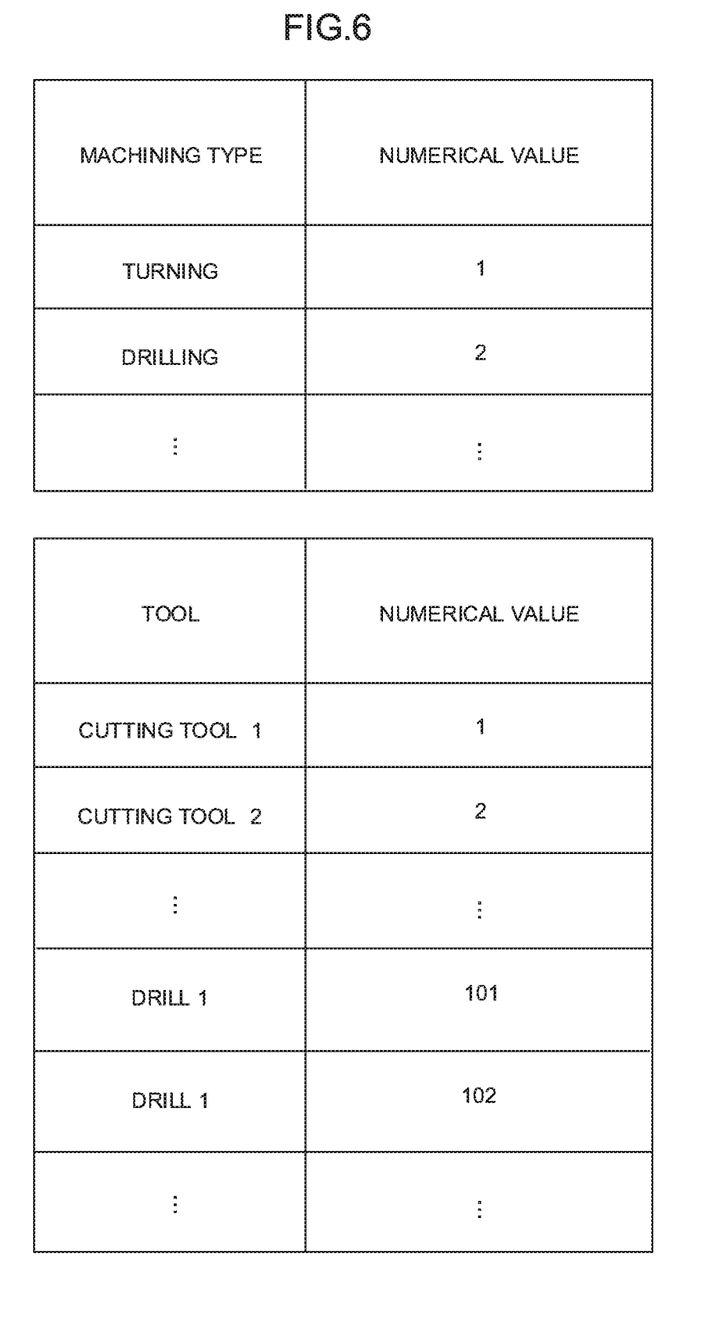
FIG. 6 is a diagram for explaining a method for creating input data expressed in numerical form.

The state observation unit 112 creates a piece of manual-operation-related information (input data) from the log data stored in the log data storage unit 200 and outputs the created input data to the learning unit 111. If a piece of information, from which input data is to be created, is expressed as a numerical value (for example, a tool offset value, a spindle coordinate value, or a spindle movement speed) in the log data, the state observation unit 112 may include the piece of information in the input data without change. If a piece of information, from which input data is to be created, is expressed as information other than a numerical value, such as a character string, (for example, machining type, a current tool, machine modal information, or a spindle-in-rotation signal) in the log data, the state observation unit 112 may store a conversion table as shown in, for example, FIG. 6 in advance in a memory (not shown), and convert the information other than a numerical value into a numerical value using the conversion table and include the numerical value in the input data.

Additionally, the state observation unit 112 may convert some of pieces of information included in a piece of manual-operation-related information by a different conversion method and create pieces of data to be included in input data. More specifically information indicating a state at the start of manual operation may be converted into a form more suitable for showing the state at the start of the manual operation, and information indicating a history of operations may be converted into a form more suitable for showing a difference in operation history pattern.

For example, information indicating a history of operations may be represented by a state transition expression where $q_0$ represents a state at the start of manual operation, $q_0$ to $q_{n-1}$ each represent a state in which a manual operation is performed, and $x_0$ to $x_{m-1}$ represent the operations, as given by Expression (1) below. The subscripts of states when a given series of operations is input may be employed as one input to a machine learning instrument. In the above-described manner, a series of operations extracted from a history of operations included in the log data is converted into numerical values. This allows inclusion of information having a given meaning as information indicating a history of operations in input data.

$$\delta(\text{user's operation}, \text{current state}) = \text{next state}$$

$$x = (x_0, x_1, \ldots, x_{m-1}): \text{user's operation(input)}$$

$$q = (q_0, q_1, \ldots, q_{n-1}): \text{state(input)}$$

$$q_0: \text{initial state} \quad (1)$$

The label acquisition unit 113 creates teacher data (information related to the occurrence or non-occurrence of a spindle collision) corresponding to input data on the basis of the log data stored in the log data storage unit 200 in synchronization with creation of the input data by the state observation unit 112 and outputs the created teacher data to the learning unit 111.

With the above-described configuration, the machine learning device 110 can advance learning on which operation by an operator causes a spindle collision and in which state the operation is performed, at the time of manual operation performed on the machine tool 1 by an operator, and construct a learning model.

The machine learning device 110 that predicts a spindle collision using a constructed learning model will next be described.

Figure 7:
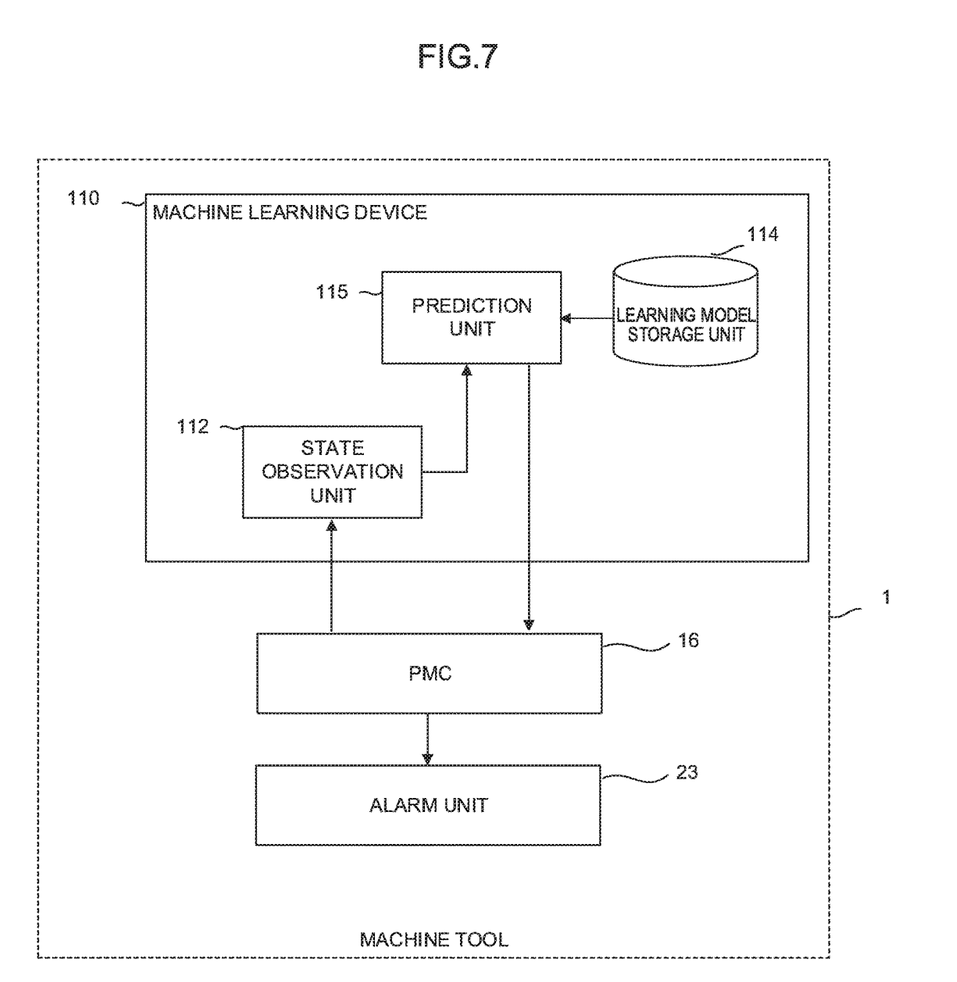
FIG. 7 is a schematic functional block diagram of a machine learning device according to an embodiment of the present invention at the time of spindle collision prediction.

FIG. 7 is a schematic functional block diagram of a machine learning device according to an embodiment of the present invention at the time of spindle collision prediction.

A machine learning device 110 according to the present embodiment is used connected to a machine tool 1 as an environment via a PMC 16. Note that although only the PMC 16 and an alarm unit 23 are shown as functional blocks of the machine tool 1 in FIG. 7, the machine tool 1 actually includes the units of the machine tool 1 shown in FIG. 1.

The machine learning device 110 includes a state observation unit 112, a learning model storage unit 114, and a prediction unit 115.

In the machine tool 1, machining based on a machining program is performed, execution of the machining program is interrupted, and manual operation by an operator is performed. During the manual operation, the state observation unit 112 acquires, via the PMC 16, a piece of manual-operation-related information used as input data at the time of the above-described learning, creates input data on the basis of the acquired piece of information, and outputs the input data to the prediction unit 115. The state observation unit 112 stores information indicating a state at the start of the manual operation by the operator and key operations, manual setting actions, and the like performed by the operator through operation of a machine operation panel 18 or the like after the start of the manual operation, as a series of operations, in memory (not shown). The state observation unit 112 creates input data and outputs the input data to the prediction unit 115 each time the manual operation by the operator is advanced on the basis of the stored pieces of information. The state observation unit 112 performs conversion processing, such as numerical conversion, on the piece of manual-operation-related information acquired from the PMC 16, as in the learning.

The prediction unit 115 performs spindle collision prediction using a learning model stored in the learning model storage unit 114 on the basis of input data input from the state observation unit 112.

By way of example, in a case where the multi-layer neural network shown in FIG. 5 is used as a learning model, a prediction value for the occurrence or non-occurrence of a spindle collision is output by giving input data created from an acquired piece of manual-operation-related information to the multi-layer neural network.

In the above-described manner, the prediction unit 115 predicts whether a spindle collision occurs due to an operation with a key switch pressed by an operator and outputs a prediction value as a result of the prediction to the PMC 16 of the machine tool 1. If the prediction value for a spindle collision input from the prediction unit 115 is a value indicating a spindle collision, the PMC 16 instructs the alarm unit 23 to issue an alarm.

When instructed by the PMC 16 to issue an alarm, the alarm unit 23 notifies, through a lamp arranged on the machine operation panel 18, an indication on a display device 20, a sound, or the like, an operator of the possibility of a spindle collision due to an operation in question. The alarm unit 23 may instruct the axis control circuit 14 to stop axial movement by an operator's manual operation or to slow an axial movement speed, in addition to issuance of an alarm.

As described above, the machine learning device 110 uses a learning model obtained as a result of learning based on pieces of information related to manual operations on one or more machine tools 1 by an operator. With this use, the machine learning device 110 can predict whether a spindle collision occurs due to a manual operation when the manual operation is actually performed on the machine tool 1 by an operator. If the machine learning device 110 predicts that a spindle collision will occur, the machine tool 1 issues an alarm to the operator upon receipt of a result of the prediction and stops axial movement by an operator's manual operation. This allows prevention of a spindle collision.

The embodiments of the present invention have been described above. The present invention, however, is not limited to the illustrated embodiments and may be carried out in various modes by making appropriate changes thereto.

The above-described embodiments have illustrated learning by and utilization of one machine learning device 110. Since a learning model itself constructed by the learning unit 111 and stored in the learning model storage unit 114 is an aggregate of pieces of data indicating a result of learning, the learning model may be shared with a different machine learning device 110 via, for example, an external storage device (not shown), a network, or the like. In the case of this configuration, as for learning, a plurality of machine learning devices 110 perform learning in parallel while one learning model is shared among the machine learning devices 110. This allows shortening of the time required for completion of the learning. As for use of a learning model, the plurality of machine learning devices 110 can each perform spindle collision prediction using a shared learning model. A method for sharing a learning model is not limited to a particular method. For example, a learning model may be stored in a host computer of a factory and be shared by the machine learning devices 110. Alternatively, a learning model may be stored in advance in a server installed by a manufacturer and be shared among machine learning devices of customers.

The above-described embodiments have separately described the configuration of the machine learning device 110 at the time of learning and that of the machine learning device 110 at the time of prediction. The machine learning device 110, however, may have the configuration at the time of learning and the configuration at the time of prediction at the same time. In this case, when manual operation on the machine tool 1 by an operator is performed, the learning unit 111 can perform additional learning while the machine learning device 110 performs spindle collision prediction using a learning model.

Additionally in the above-described embodiments, the two values "Occurrence or non-occurrence of spindle collision: occurred" and "Occurrence or non-occurrence of spindle collision: not occurred" as teacher data are learned without change. It is also possible to learn the probability of a collision on the basis of the frequency of collisions. In the case of such learning, the above-described alarm unit 23 may issue an alarm to an operator if the probability of a spindle collision is higher than a first threshold α and may stop axial movement by an operator's manual operation or slow an axial movement speed if the probability is higher than a second threshold β that is a probability higher than the first threshold α.

The invention claimed is:

1. A machine tool, comprising:
a plurality of control circuits for moving a spindle including a tool relative to a workpiece by controlling at least one axis on the basis of a machining program and machining the workpiece; and
a machine learning device which includes a processor configured to predict occurrence or non-occurrence of a collision between
(i) the spindle or the tool, and
(ii) the workpiece, a jig holding the workpiece, or a constituent element of the machine tool,
said collision caused by an operation for the axis through manual operation after interruption of the machining, wherein
the machine learning device further includes a storage device which stores a learning model constructed by supervised learning using
(i) input data based on information related to the manual operation, and
(ii) teacher data based on information related to the occurrence or non-occurrence of the collision of the spindle or the tool at the time of the manual operation, and
the processor is further configured to
acquire the information related to the manual operation from log data recorded at the time of the manual operation in the machine tool,
create the input data on the basis of the information related to the manual operation acquired from the log data, wherein the input data include (i) first input data in a case where a spindle collision occurred due to an improper manual operation by an operator, and (ii) second input data in a case where no spindle collision occurred due to an improper manual operation by an operator, and
predict, using the learning model, the occurrence or non-occurrence of the collision of the spindle or the tool from the input data created based on the information related to the manual operation.

2. The machine tool according to claim 1, further comprising:
an alarm unit configured to output an alarm on the basis of a result of the prediction of the occurrence or non-occurrence of the collision of the spindle or the tool from the machine learning device.

3. The machine tool according to claim 2, wherein the machine learning device is further configured to share the learning model stored in the storage device with at least one different machine tool.

4. A machine learning device for, in a machine tool which moves a spindle including a tool relative to a workpiece by controlling at least one axis on the basis of a machining program and machines the workpiece, learning occurrence or non-occurrence of a collision between (i) the spindle or the tool and (ii) the workpiece, a jig holding the workpiece, or a constituent element of the machine tool, said collision caused by an operation for the axis through manual operation after interruption of the machining, the machine learning device comprising:

a processor configured to
acquire information related to the manual operation from log data recorded when the machining and the manual operation are performed in the machine tool,
create input data on the basis of the information related to the manual operation acquired from the log data, wherein the input data include (i) first input data in a case where a spindle collision occurred due to an improper manual operation by an operator, and (ii) second input data in a case where no spindle collision occurred due to an improper manual operation by an operator,
acquire information related to the occurrence or non-occurrence of the collision of the spindle or the tool at the time of the manual operation from the log data recorded when the machining and the manual operation are performed in the machine tool,
create teacher data on the basis of the information related to the occurrence or non-occurrence of the collision of the spindle or the tool acquired from the log data,
perform supervised learning using the input data created based on the information related to the manual operation and the teacher data created based on the information related to the information related to the occurrence or non-occurrence of the collision of the spindle or the tool, and construct a learning model; and
a storage device which stores the learning model.

5. A machine learning device for, in a machine tool which moves a spindle including a tool relative to a workpiece by controlling at least one axis on the basis of a machining program and machines the workpiece, predicting occurrence or non-occurrence of a collision between (i) the spindle or the tool and (ii) the workpiece, a jig holding the workpiece, or a constituent element of the machine tool, said collision caused by an operation for the axis through manual operation after interruption of the machining, the machine learning device comprising:
a storage device which stores a learning model constructed by supervised learning using
(i) input data based on information related to the manual operation, and
(ii) teacher data based on information related to the occurrence or non-occurrence of the collision of the spindle or the tool at the time of the manual operation;
a processor configured to
acquire the information related to the manual operation from log data recorded at the time of the manual operation in the machine tool,
create the input data on the basis of the information related to the manual operation acquired from the log data, wherein the input data include (i) first input data in a case where a spindle collision occurred due to an improper manual operation by an operator, and (ii) second input data in a case where no spindle collision occurred due to an improper manual operation by an operator, and
predict, using the learning model, the occurrence or non-occurrence of the collision of the spindle or the tool from the input data created based on the information related to the manual operation.

6. The machine learning device according to claim 4, wherein the machine learning device is further configured to share the learning model stored in the storage device with at least one different machine learning device.

* * * * *